March 7, 1967  J. J. STOKES, JR  3,307,976
PRIMARY CELL
Filed Nov. 25, 1964
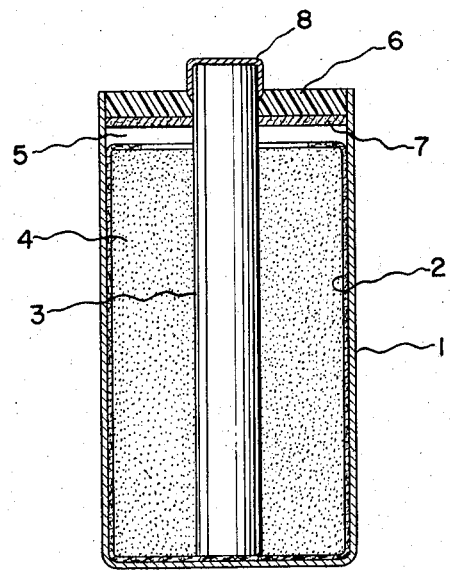
INVENTOR.
JOHN J. STOKES, JR.
BY George B. Todd
ATTORNEY 3,307,976
PRIMARY CELL
John J. Stokes, Jr., Murrysville, Pa., assignor to Aluminum Company of America, Pittsburgh, Pa., a corporation of Pennsylvania
Filed Nov. 25, 1964, Ser. No. 413,874
15 Claims. (Cl. 136—100)

This invention relates to an improved primary cell of the "dry" type having an aluminous metal anode and a carbon current collector, often popularly referred to as a "cathode," and has particular reference to the composition of electrolyte pastes suitable for use in such cells. The term "aluminous metal" as used herein refers to aluminum and alloys containing more than 90% by weight of that element. The term "open circuit voltage" as used herein refers to the initial electromotive force developed by a cell when the circuit is first closed. The term "capacity" as used herein refers to the minutes of discharge until the voltage has dropped to 0.90 volt as measured by the National Bureau of Standards heavy industrial flashlight (4 ohm) test. The term "shelf life" as used herein refers to the length of time for which a cell may be stored under ordinary room conditions with no leakage and retain no less than 75% of its capacity. The term "flash current" as used herein refers to the current reading obtained through the initial closing of the circuit through an ammeter directly across the electrodes of the cell.

A general object of this invention is to provide a dry cell having an aluminous metal anode that combines the feature of high output capacity with a long shelf life, and is suitable for use in electrical equipment designed for the commonly used zinc cells. Therefore, a cell is desired having an aluminous anode which has a low internal resistance without subjecting the anode to attack to a substantial extent while the circuit is open. These and other objects of the invention will become apparent when the following description is considered in light of the accompanying drawing, which shows a dry cell in partial section.

The dry cells commonly used, such as the Leclanchè cell, consist of a zinc anode can, a carbon current collector in the form of a rod, and a paste containing an electrolyte and a depolarizer. The use of aluminum for dry cell anodes is attractive because of its high potential in the electromotive series, its ability to be worked, and its ready availability. Important difficulties encountered in the use of aluminum anodes for this purpose that have hindered commercial development of cells with aluminum anodes have included the oxide film which is formed on the aluminum surface of the anode which is not dissolved readily by the electrolyte, and the rapid corrosion of the anode when the cell is not in use. An example of a cell having an aluminous metal anode is found in United States Patent 2,838,591 involving the use of an electrolyte paste of aluminum chloride and ammonium, sodium, or potassium chromates. That electrolyte paste has been found to be deficient in its ability to provide a combination of a high output capacity and a long shelf life in a dry cell with aluminous metal anodes.

I have discovered that the foregoing objectives can be achieved in a cell having an aluminous metal anode using chromic chloride as the principal electrolyte, either alone or in combination with a chloride selected from the group consisting of ammonium chloride and aluminum chloride and a chromate selected from the group consisting of ammonium, sodium, and potassium chromates in a water paste also containing manganese dioxide depolarizer and finely divided carbon, all within the proportions referred to below. Cells made according to my invention have high capacities, a high output of current, and a long shelf life. Such cells have a capacity of at least 810 minutes discharge time and a shelf life of at least three years. In contrast, common zinc anode cells provide a capacity between 790 and 795 minutes discharge time and an average shelf life of less than three years. Also, the cells containing my paste formulation generally have an initial open circuit voltage of more than 1.6 volts. Due to the rapid corrosion of aluminum in an ordinary ammonium chloride solution, ammonium chloride has not been used with an aluminum anode. One of the surprising results I have discovered is that a chromic chloride electrolyte paste containing ammonium chloride and ammonium chromate gives the longest shelf life of the compositions I have tested.

To achieve such results as above, the electrolyte paste should contain on a dry weight basis, from 3 to 30% of chromic chloride hexahydrate as the essential electrolyte component. Two groups of additives which may be included to supplement the chromic chloride hexahydrate are as follows: from 3 to 30 percent of at least one chloride selected from the group consisting of ammonium chloride and aluminum chloride hexahydrate, and from 3 to 30 percent of one or more chromates selected from the group consisting of ammonium, sodium, and potassium chromates. The aluminum chloride may be employed without the addition of chromates or the chromates may be used in the absence of the aluminum chloride. To achieve the best results when ammonium chloride is added, the amount of aluminum chloride present should not exceed the ammonium chloride. When ammonium chloride is present, the chromates must also be added. The aluminum chloride serves to increase the initial voltage in a cell containing chromic chloride. Ammonium chloride in combination with chromic hexahydrate tends to flatten the discharge curve, thus causing the voltage to drop off less rapidly with use of the cell. The chromates are added for the purpose of decreasing corrosive attack on the aluminum anode, thus minimizing pinpoint corrosion and perforation of the anode can. When these additions are made to the paste in the proportions and under the limitations I have given, they accomplish their purposes without affecting adversely the desired characteristics of the cell. In referring to the use of the hexahydrate of chromic and aluminum chlorides, it is to be understood that the anhydrous chlorides can also be used providing that the amounts correspond to those occurring in the hexahydrate. It will be appreciated that if the anhydrous chlorides are employed in formulating the paste, they become hydrated and form the hexahydrate. For this and other reasons, it is preferred to use the commercially available hexahydrates in preparing a paste.

The other essential ingredients of a paste are the manganese dioxide depolarizer, conventional finely divided carbon, preferably acetylene black, and water. The manganese dioxide content of the electrolyte pastes varies from 35 to 80% of the dry weight and is of conventional dry cell grade. The carbon constitutes from 5 to 30 percent of the total dry composition. Preferably, the weight ratio of manganese dioxide to carbon will be in the range from 1:1 to 10:1.

While my invention may be practiced with the electrolyte concentrations within the foregoing ranges, the best results are obtained when concentration range of the chromic chloride hexahydrate is from 5 to 15 percent, of the chlorides selected from the group composed of aluminum chloride hexahydrate and ammonium chloride, from 5 to 15 percent, and of the chromates selected from the group composed of sodium, potassium, and ammonium chromates from 4 to 10 percent.

Sufficient water is added to produce a paste that can be readily handled and to provide enough water for operation of the cell as well as to hydrate any initially anhydrous components. This amount may vary over a considerable range, but it usually is in the proportion of from 10 to 30 parts of water to 70 to 90 parts of the dry mixture.

The electrolyte paste mixture should be acidic, that is have a pH less than 7, preferably between 3.1 and 5.5.

A preferred embodiment of my invention is a paste which consists on a dry basis of from 5 to 15 percent of chromic chloride hexahydrate, from 5 to 15 percent of ammonium chloride, from 4 to 10 percent of ammonium chromate, the quantity of the chromic chloride hexahydrate being at least equal to or exceeding the quantity of ammonium chloride and the quantity of chromates, from 35 to 80 percent of manganese dioxide, from 5 to 30 percent of finely divided carbon, the ratio of manganese dioxide to carbon being between the proportions of from 1:1 to 10:1, and sufficient water for operation of the cell and to provide a paste that can be readily handled. Such a paste has a pH between 3.1 and 5.5.

The foregoing paste mixtures are adapted for use with aluminous metal anodes, that is, anodes of aluminum and aluminum base alloys containing at least 90 percent aluminum. It is desirable to use alloys that do not require solution heat treatment to increase their strength since high strength is not required in a cell container. Examples of satisfactory aluminum base alloys are those consisting of aluminum and 0.5 to 1.5% manganese, or 1 to 3% magnesium, or 0.001 to 5% zinc. Minor amounts of other elements, such as boron, titanium, chromium, and copper may be present in amounts of less than 0.5%, to refine the grain size or improve other characteristics associated with casting and fabrication. The preferred form of anode is an aluminum-zinc alloy containing zinc within the range stated above, where the alloy also contains not more than 0.2% impurities. The anode may have the same composition throughout or it may have a composite structure wherein the anode alloy is bonded to a less anodic aluminous base. Improved results are obtained with a composite anode; such anodes are described and claimed in United States Patent 2,796,456.

As an example of a dry cell of the type described above, reference is made to the accompanying drawing where the cell container 1 is provided with an absorbent paper liner 2 and a centrally disposed carbon rod 3. The space between the liner and the rod is filled with the electrolyte paste 4 which is formulated according to my invention. Above the paste mixture a space 5 is left to permit expansion of the mixture during the period of use. The cell is sealed by a suitable plastic or resinous substance 6 poured against a pulp board separator 7. A conventional metal cap 8 is provided on the upper end of the carbon rod to establish good electrical connection with any other metallic conductor. A conventional paper covering, not shown in the drawing, is used to insulate the cell from any structure in which it is mounted.

A dry cell utilizing my invention may be manufactured according to conventional procedure. The container or shell can be drawn from sheet or made by impact extrusion of slugs, or produced by any other known practice. After filling the container to the desired depth, the carbon rod is thrust into the paste so as to occupy a central position, a separator is pushed into the top of the cell and suitable plastic or resin poured onto the separator. The container or shell should preferably have a wall thickness of about 0.010 to 0.020 inch depending on the size of the cell and the service expected of it. For a size "D" cell, I have found that a wall thickness of 0.016 to 0.018 inch provides sufficient metal to give performance comparable to that of a commercial zinc cell.

The following paste formulations that have been prepared, based on dry weight, illustrate my invention:

I

|  | Percent |
|---|---|
| $CrCl_3 \cdot 6H_2O$ | 15.2 |
| $MnO_2$ | 76.3 |
| Acetylene black | 8.5 |

II

| | |
|---|---|
| $CrCl_3 \cdot 6H_2O$ | 7.6 |
| $AlCl_3 \cdot 6H_2O$ | 5.2 |
| $(NH_4)_2CrO_4$ | 3.0 |
| $MnO_2$ | 75.0 |
| Acetylene black | 9.2 |

III

| | |
|---|---|
| $CrCl_3 \cdot 6H_2O$ | 6.8 |
| $NH_4Cl$ | 6.8 |
| $(NH_4)_2CrO_4$ | 5.0 |
| $MnO_2$ | 71.2 |
| Acetylene black | 10.2 |

Water was added to Formulations I and II in the approximate ratio of 20 parts of water to 80 parts of the dry mix; in Formulation III, the ratio was 25 parts of water to 75 parts of the mixture.

A flashlight cell having an anode can made of 99.8 percent purity aluminum and filled with the paste of Formulation I gave an open circuit voltage of 1.62 volts and a flash current of 3.6 amperes. The corresponding values for Formulations II and III were 1.62 volts and 3.9 amperes and 1.68 volts and 6.2 amperes, respectively. In comparison, the open circuit voltage of zinc cells is usually in the range from 1.5 to 1.55 volts. The capacity of cells using these three formulations was tested by the heavy industrial flashlight (4 ohm) test as described in National (U.S.) Bureau of Standards Handbook 71 (1959). In each case, commercial zinc cells were tested by the same procedure, yielding identical values of 792 minutes. The following results were obtained, expressed in minutes of discharge until a value of 0.90 volt was obtained:

| Paste Formulation | Minutes | Zn Cell, minutes |
|---|---|---|
| I | 820 | 792 |
| II | 840 | 792 |
| III | 913 | 792 |

For fresh dry cells made according to my invention, a capacity of at least 810 minutes as measured by the heavy industrial flashlight test is characteristic. This improvement over the values obtained for the zinc cells, which are typical, is significant where a large number of the cells is used. Another significant improvement of my invention over the zinc cells is shown after prolonged storage periods. After storage for three years, cells made according to my invention retain at least 80 percent of their initial capacity. If a zinc cell is still operative at the end of three years, it has less than 50 percent of its original capacity. Thus, cells with aluminous metal anodes and the paste of my invention have a higher initial capacity than zinc cells, and have a much better ability to retain their capacity over prolonged periods of storage than zinc cells.

Aluminum anode cells having electrolyte pastes formulated within the composition limits set forth herein have had a minimum shelf life of three years, combining this long shelf life with high open circuit voltages and high capacities. The cells of my invention can be readily substituted for zinc cells in electrical equipment designed for use with that type of cell.

Having thus described my invention and certain embodiments thereof, I claim:

1. An electrolyte paste for a dry cell having an aluminous metal anode, said paste containing on a dry weight basis as the essential electrolyte component from 3 to 30 percent of chromic chloride hexahydrate, from 35 to 80 percent of manganese dioxide depolarizer, from 5 to 30 percent of finely divided carbon, and sufficient water to give a paste of the desired consistency, said paste having a pH of less than 7, said paste being characterized by having a capacity in a fresh cell with an aluminous metal anode of not less than 810 minutes discharge time until the voltage has dropped to 0.90 volt as measured by the National Bureau of Standards heavy industrial flashlight test.

2. The paste of claim 1, said paste having a pH between 3.1 and 5.5 and having a ratio by weight of manganese dioxide to carbon in the range from 1:1 to 10:1.

3. An electrolyte paste for a dry cell having an aluminous metal anode, said paste on a dry weight basis consisting essentially of from 3 to 30 percent of chromic chloride hexahydrate, from 3 to 30 percent of aluminum chloride hexahydrate, the amount of said chromic chloride hexahydrate not being less than the aluminum chloride hexahydrate, from 35 to 80 percent of manganese dioxide, from 5 to 30 percent of finely divided carbon, and sufficient water to give a paste of the desired consistency, said paste having a pH of less than 7 and said paste being characterized by having a capacity in a fresh cell with an aluminous metal anode of not less than 810 minutes discharge time to 0.90 volt, as measured by the National Bureau of Standards heavy industrial flashlight test.

4. An electrolyte paste for a dry cell having an aluminous metal anode, said paste on a dry weight basis consisting essentially of from 3 to 30 percent of chromic chloride hexahydrate, from 3 to 30 percent of at least one compound selected from the group consisting of ammonium, sodium, and potassium chromates, the amount of said chromic chloride hexahydrate not being less than any one of the chromates of said group, from 35 to 80 percent of manganese dioxide, from 5 to 30 percent of finely divided carbon, and sufficient water to give a paste of the desired consistency, said paste having a pH of less than 7 and said paste being characterized by having a capacity in a fresh cell with an aluminous metal anode of not less than 810 minutes discharge time to 0.90 volt, as measured by the National Bureau of Standards heavy industrial flashlight test.

5. An electrolyte paste for a dry cell having an aluminous metal anode, said paste on a dry weight basis consisting essentially of from 3 to 30 percent of chromic chloride hexahydrate, from 3 to 30 percent of at least one compound selected from the group consisting of ammonium chloride and aluminum chloride hexahydrate, from 3 to 30 percent of at least one compound selected from the group consisting of ammonium, sodium, and potassium chromates, the amount of said chromic chloride hexahydrate not being less than any one of the chlorides selected from said chloride group and not less than any one of the chromates selected from said chromate group, from 35 to 80 percent of manganese dioxide, from 5 to 30 percent of finely divided carbon, and sufficient water to give a paste of the desired consistency, said paste having a pH of less than 7 and said paste being characterized by having a capacity in a fresh cell with an aluminous metal anode of not less than 810 minutes discharge time to 0.90 volt, as measured by the National Bureau of Standards heavy industrial flashlight test.

6. The paste of claim 5, said paste having a pH between 3.1 and 5.5, and having a ratio by weight of manganese dioxide to carbon in the range from 1:1 to 10:1.

7. An electrolyte paste according to claim 5 wherein the paste contains from 5 to 15 percent of chromic chloride hexahydrate, and from 5 to 15 percent of at least one of the chlorides of the group composed of aluminum chloride hexahydrate and ammonium chloride.

8. An electrolyte paste according to claim 5 wherein the paste contains from 5 to 15 percent of chromic chloride hexahydrate, from 5 to 15 percent of at least one of the chlorides of the group composed of aluminum chloride hexahydrate, and ammonium chloride, and from 4 to 10 percent of at least one of the chromates of the group consisting of sodium, potassium, and ammonium chromates.

9. An electrolyte paste for a dry cell having an aluminous metal anode, said paste on a dry weight basis consisting of from 5 to 15 percent of chromic chloride hexahydrate, from 5 to 15 percent of ammonium chloride, from 4 to 10 percent of ammonium chromate, the amount of said chromic chloride hexahydrate not being less than the ammonium chloride and not less than the ammonium chromate, from 35 to 80 percent of manganese dioxide, from 5 to 30 percent of finely divided carbon, the ratio by weight of manganese dioxide to carbon in the range from 1:1 to 10:1, and sufficient water to give a paste of the desired consistency, said paste having a pH between 3.1 and 5.5.

10. A dry cell comprising an aluminous metal anode, a carbon current collector and an electrolyte paste filling completely the space between the anode and the cathode, said paste containing on a dry weight basis as the essential electrolyte component from 3 to 30 percent of chromic chloride hexahydrate, from 35 to 80 percent of manganese dioxide depolarizer, from 5 to 30 percent of finely divided carbon, and sufficient water to give a paste of the desired consistency, said paste having a pH of less than 7 and producing in said cell a capacity when fresh of not less than 810 minutes discharge time to 0.90 volt, as measured by the National Bureau of Standards heavy industrial flashlight test.

11. A dry cell comprising an aluminuous metal anode, a carbon current collector and an electrolyte paste filling completely the space between the anode and the cathode, said paste on a dry weight basis consisting essentially of from 3 to 30 percent of chromic chloride hexahydrate, from 3 to 30 percent of aluminum chloride hexahydrate, the amount of said chromic chloride hexahydrate not being less than the aluminum chloride hexahydrate, from 35 to 80 percent of manganese dioxide, from 5 to 30 percent of finely divided carbon, and sufficient water to give a paste of the desired consistency, said paste having a pH of less than 7 and producing in said cell a capacity when fresh of not less than 810 minutes discharge time to 0.90 volt, as measured by the National Bureau of Standards heavy industrial flashlight test.

12. A dry cell comprising an aluminous metal anode, a carbon current collector and an electrolyte paste filling completely the space between the anode and the cathode, said paste on a dry weight basis consisting essentially of from 3 to 30 percent of chromic chloride hexahydrate, from 3 to 30 percent of at least one compound selected from the group consisting of ammonium, sodium, and potassium chromates, the amount of said chromic chloride hexahydrate not being less than any one of the chromates of said group, from 35 to 80 percent of manganese dioxide, from 5 to 30 percent of finely divided carbon, and sufficient water to give a paste of the desired consistency, said paste having a pH of less than 7 and producing in said cell a capacity when fresh of not less than 810 minutes discharge time to 0.90 volt, as measured by the National Bureau of Standards heavy industrial flashlight test.

13. A dry cell comprising an aluminuous metal anode, a carbon current collector and an electrolyte paste filling completely the space between the anode and the cathode, said paste on a dry weight basis consisting essentially of from 3 to 30 percent of chromic chloride hexahydrate, from 3 to 30 percent of at least one compound selected from the group consisting of ammonium chloride and aluminum chloride hexahydrate, from 3 to 30 percent of at least one compound selected from the group consisting of ammonium, sodium, and potassium chromates, the amount of said chromic chloride not being less than any one of the chlorides selected from said chloride group and not less than any one of the chromates selected from said chromate group, from 35 to 80 percent of manganese dioxide, from 5 to 30 percent of finely divided carbon, and sufficient water to give a paste of the desired consistency, said paste having a pH of less than 7 and producing in said cell a capacity when fresh of not less than 810 minutes discharge time to 0.90 volt, as measured by the National Bureau of Standards heavy industrial flashlight test.

14. A dry cell according to claim 13, wherein the electrolyte paste of said cell contains from 5 to 15 percent of chromic chloride hexahydrate and from 5 to 15 percent of at least one of the chlorides of the group composed of aluminum chloride hexahydrate and ammonium chloride.

15. A dry cell according to claim 13, wherein the electrolyte paste of said cell contains from 5 to 15 percent of chromic chloride hexahydrate, from 5 to 15 percent of at least one of the chlorides of the group composed of aluminum chloride hexahydrate and ammonium chloride, and from 4 to 10 percent of at least one of the chromates of the group consisting of sodium, potassium, and ammonium chromates.

References Cited by the Examiner

UNITED STATES PATENTS

| | | | |
|---|---|---|---|
| 2,638,489 | 5/1953 | Ruben | 136—100 X |
| 2,838,591 | 6/1958 | Stokes | 136—100 |
| 3,035,945 | 5/1962 | Lawson | 136—154 |

References Cited by the Applicant

UNITED STATES PATENTS

| | | |
|---|---|---|
| 344,347 | 6/1886 | Case. |
| 3,048,647 | 8/1962 | Korver et al. |

FOREIGN PATENTS

| | | |
|---|---|---|
| 18,115 | 8/1909 | Great Britain. |

WINSTON A. DOUGLAS, *Primary Examiner.*

D. L. WALTON, *Assistant Examiner.*